United States Patent [19]

Morishita et al.

[11] Patent Number: 5,580,677
[45] Date of Patent: Dec. 3, 1996

[54] UNIT BATTERY OF SEALED ALKALINE STORAGE BATTERY AND BATTERY SYSTEM

[75] Inventors: Nobuyasu Morishita, Fujiidera; Shinji Hamada, Neyagawa; Hiromu Matsuda, Hyogo-ken; Munehisa Ikoma, Nara-ken, all of Japan

[73] Assignee: Matsushita Electric Industrial Co., Ltd., Osaka, Japan

[21] Appl. No.: 171,603

[22] Filed: Dec. 22, 1993

[30] Foreign Application Priority Data

Sep. 17, 1993 [JP] Japan .................. 5-231192

[51] Int. Cl.⁶ .............. H01M 6/46; H01M 2/10
[52] U.S. Cl. .............. 429/152; 429/66; 429/72; 429/176; 429/195
[58] Field of Search .............. 429/152, 120, 429/195, 176, 175, 72, 66, 148, 149

[56] References Cited

U.S. PATENT DOCUMENTS

| | | | |
|---|---|---|---|
| 2,667,527 | 1/1954 | Pucher | 429/149 |
| 3,463,672 | 8/1969 | Schmidt . | |
| 4,107,402 | 8/1978 | Dougherty et al. | 429/120 |
| 4,468,440 | 8/1984 | Evjen . | |
| 4,732,826 | 3/1988 | Hardigg | 429/176 |
| 4,871,627 | 10/1989 | Strong et al. | 429/27 |
| 5,209,991 | 5/1993 | Stocchiero | 429/66 |
| 5,212,024 | 5/1993 | Klink et al. | 429/72 |

FOREIGN PATENT DOCUMENTS

| | | |
|---|---|---|
| 0533317A2 | 3/1993 | European Pat. Off. . |
| 3904717A1 | 8/1989 | Germany . |
| 58-165277 | 9/1983 | Japan . |
| 3291867 | 12/1991 | Japan . |
| 3291867A | 12/1991 | Japan . |

Primary Examiner—George Fourson
Assistant Examiner—C. Everhart
Attorney, Agent, or Firm—Watson Cole Stevens Davis, P.L.L.C.

[57] ABSTRACT

The present invention provides a unit battery of sealed alkaline storage battery comprising a plurality of cells each of which comprises a container in which are inserted an alkali electrolyte and an electrode group comprising a plurality of positive plates and a plurality of negative plates with separators provided between the adjacent plates and which is sealed by a cap provided with a safety valve, the adjacent cells being electrically connected, wherein at least a part of the outermost portion of the electrode group in the cell contacts with the container, the adjacent cells contact with each other at at least a part of their container and a space through which air can pass in at least one direction is provided between the adjacent cells, the unit battery being constrained by holders at a part or the whole surface of both ends in the direction of arranging of the cells. The present invention further provides a sealed alkaline storage battery system comprising an assembled battery which consists of a plurality of the unit batteries.

61 Claims, 2 Drawing Sheets

UNIT BATTERY OF SEALED ALKALINE STORAGE BATTERY AND BATTERY SYSTEM

BACKGROUND OF THE INVENTION

1. Field of the Invention

The present invention relates to a unit battery of sealed alkaline storage battery of relatively large cape city and to a sealed alkaline storage battery system.

2. Description of Prior Art

Sealed alkaline storage batteries are represented by nickel•cadmium storage batteries and nickel•hydrogen storage batteries and are high in energy density and excellent in reliability. Therefore, they are widely used as electric sources for portable apparatuses such as videotape recorders, lap-top type computers and pocket telephones.

These are mainly small-sized sealed alkaline storage batteries which comprise a metallic container, have a cylindrical or rectangular shape and have a capacity of about 0.5–3 Ah. In actual use, several to several ten cells are put in a resin container or tube.

Since these small-sized sealed alkaline storage batteries have a capacity of about 0.5–3 Ah, the quantity of heat generated at the time of charging and discharging per cell is small. Accordingly, when they are used in a resin container or tube, generation of heat and dissipation of heat are properly balanced and so there has been no serious problem resulting from the rise of temperature of batteries. Furthermore, electrode group of alkaline storage batteries expand due to repetition of charging and discharging, but the container is in the form of a metallic cylinder and there have been no problems such as distortion of the container due to expansion of the electrode group. For the rectangular container, since the battery is small, no special means has been needed.

However, recently, medium-sized and large-sized batteries of high energy and high reliability (here, the medium-sized battery is defined to be one having a capacity of 10–100 Ah and the large-sized battery is defined to be one having a capacity of higher than 100 Ah and several to several hundred cells are used) are strongly demanded as portable electric sources for house hold appliances and electric cars. As the medium-sized and large-sized batteries, open nickel•cadmium batteries or lead storage batteries are used for storage of energy and for UPS, but there are troubles in maintenance such as filling of electrolyte during period of service. Therefore, maintenance free batteries, namely, sealed batteries are necessary as portable electric sources for household appliances, electric cars and the like. As explained above, when alkaline storage batteries are used as portable electric sources for household appliances, electric cars and the like, sealed and medium-sized or large-sized batteries are necessary.

That is, it is necessary to connect many cells in series for increasing electric capacity of cells and cell voltage with sealed cells.

A cell generates heat of reaction due to the electrode reaction and Joule's heat by charging and discharging. Quantity of heat generated increases due to increase in electric capacity of cells and by sealing of the cells, and dissipation of heat to outside is delayed. Thus, the generated heat is accumulated in the battery and as a result, the temperature in the battery is higher than that in the small-sized batteries. Furthermore, in the container of a unit battery consisting of the cells of such large capacity connected in series or an assembled battery consisting of unit batteries connected in series, several ten cells to several hundred cells are arranged adjacent to each other. In order to solve the above problems, Japanese Patent Kokai (Laid-Open) No. 3-291867 proposes a heat dissipation device for a storage battery system in which a large number of cells which are composed of positive electrodes, negative electrodes and an electrolyte and which generate heat at the time of charging are arranged, characterized in that spaces are provided between the cells, and width of space/width of cell is in the range of 0.1–1.0.

However, in spite of these attempts, the above storage battery system still has the following problems in actual use.

① Since the electricity generating element expands due to repetition of charging and discharging, the container is distorted and the ratio, space width/cell width changes to render circulation of air difficult. In order to keep constant the space between the cells, it is necessary to improve the strength of the container. For improving the strength of the container, the thickness must be increased, and as a result, weight or volume of battery increases to cause substantial reduction of energy density of the battery.

② The container expands owing to increase of internal pressure of the cell and it becomes difficult to keep constant the width of spaces between which the air circulated. In order to inhibit the distortion of the container due to increase of pressure in the cell, it is necessary to increase the strength of the container.

As in the container of ①, weight or volume of the container increases for increase of the strength of the container. As a result, weight energy density and volume energy density decrease.

For solving the problems of ① and ②, it is necessary to inhibit distortion of the container at unit battery level (comprising about 5–40 cells).

③ Furthermore, if the container expands and is distorted, a space is produced between the electricity generating element and the container. If there is a space between the electricity generating element and the container, the velocity of transfer of the heat generated from the electricity generating element extremely reduces. Accordingly, it is necessary to strengthen the unit battery and to allow the container to contact always with the electrode group.

④ A system comprising many cells has been proposed, but when the system is used as a portable electric source, it is necessary to attain reduction of scattering in cell performances such as cell capacity of each of several to several hundred cells, improvement of cell performances such as energy density and furthermore, improvement of mechanical strength such as prevention of shifting of the cells in their position caused by shock in the form of a unit battery (comprising about 5–40 cells) or an assembled battery (comprising at least two unit batteries, namely, about 10–300 cells).

SUMMARY OF THE INVENTION

The present invention has solved the above problems, namely, has restrained the reduction of energy density or the distortion of containers in unit batteries or assembled batteries and improved the mechanical strength of unit batteries and assembled batteries. Furthermore, the present invention provides an excellent unit battery and a system thereof according to which distortion of the container or distortion or shifting of position of the unit battery and assembled battery does not occur even if subjected to repetition of charging and discharging or used for a long period, the heat in the battery generated at the time of charging and discharging can be effectively released out of the battery system and there is no scattering in cell performance.

DETAILED DESCRIPTION OF PREFERRED EMBODIMENTS

Figure 1A:
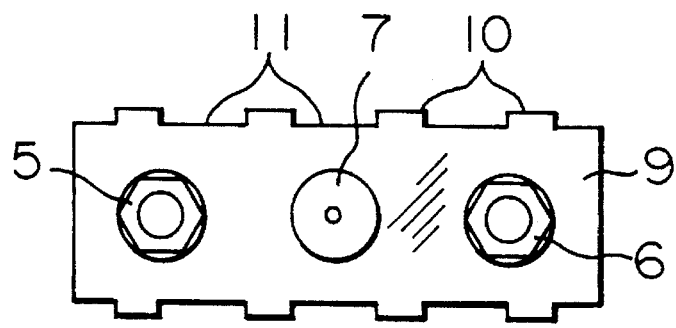
FIG. 1A is a top view of a cell of sealed alkaline storage battery made in the present invention.

The present invention relates to a collected battery (unit battery) comprising cells each of which comprises a container containing an alkaline electrolyte and an electrode group composed of a plurality of positive plates and a plurality of negative plates with separator between adjacent plates and which are sealed by a cap provided with a safety valve, the adjacent cells being electrically connected, wherein at least a part of the outermost portion of the electrode group in each cell contacts with the container, the adjacent cells act with each other at at least a part of their container, a space through which air can pass in at least one direction is provided between the adjacent cells, both ends of the unit battery in the direction of arrangement of the cells being partly or wholly constrained by a holder.

Furthermore, the present invention relates to a collected battery (unit battery) comprising cells each of which comprises a container containing an alkaline electrolyte and an electrode group composed of a plurality of positive plates and a plurality of negative plates with separators between adjacent plates and which are seal by a cap provided with a safety valve, the adjacent cells being electrically connected, wherein at least a art of the outermost part of the electrode group in each of the cells contacts with the container, an interval between the adjacent cells is fixed by a spacer, and the spacer provides a space through which air can pass in at least one direction between the spacer and the adjacent cell, both ends of the said unit battery in the direction of arrangement of the cells being partly or wholly constrained by a holder.

Moreover, the present invention relates to a sealed alkaline storage battery system which is an assembled battery comprising in combination a plurality of collected batteries (unit batteries) comprising cells each of which comprises a container containing an alkaline electrolyte and an electrode group composed of a plurality of positive plates and a plurality of negative plates with separators between adjacent plates and which are sealed by a cap provided with a safety valve, the adjacent batteries being electrically connected, wherein at least a part of the outermost part of the electrode group in each cell contacts with the container, a space through which air can pass in at least one direction is provided between the adjacent cells, both ends of the unit battery in the direction of arrangement of the cells being partly or wholly constrained by a holder, said assembled battery being fixed by a carrier, air being forcedly passed through the assembled battery by blowing and/or suction of air using a fan or a blower.

According to the above-mentioned construction, distortion of the container caused by expansion of electricity generating element due to repetition of charging and discharging or expansion of the container caused by increase of internal pressure of the cell can be inhibited since at least a part of the outermost part of the electrode group in each cell contacts with the container, the adjacent cells contact with each other at at least a part of their container, and a part of the whole surface of the both ends of the unit battery is constrained by a holder to form a space through which air can pass in at least one direction between the cells. When the expansion force of the electricity generating element in the cell generated by repetition of charging and discharging is exerted in the thickness direction of the electricity generating element, the force is exerted on the container in the same direction, and the interval between the cells decreases.

As a result, air becomes difficult to pass therethrough, resulting in problems in various battery characteristics and reliability. However, according to the construction of the present invention, since the electricity generating element contacts with the container and the adjacent cells contact with each other at their container and the interval is fixed and furthermore, the unit battery is constrained in the direction of arrangement of the cells by a holder, even if an expansion force is exerted in the thickness direction of the electricity generating element, no distortion of the container occurs because the cells and the unit batteries are fixed. This is the same when expansion of the container is generated due to increase of internal pressure of the cell. Furthermore, when the interval between the adjacent cells in the unit battery is fixed by inserting a spacer therebetween, distortion of the container also does not occur owing to the similar action. Accordingly, it becomes possible to pass the air always uniformly between the cells and thus, a unit battery excellent in heat dissipation effect car be provided. The present invention further relates to a sealed alkaline storage battery system using an assembled battery comprising in combination a plurality of collected batteries (unit batteries) comprising cells each of which comprises a container containing an alkaline electrolyte and an electrode group composed of a plurality of positive plates and a plurality of negative plates with separators between adjacent plates and which are sealed by a cap provided with a safety valve, the adjacent batteries being electrically connected, wherein at least a part of the outermost part of the electrode group in each cell contacts with the container, a space through which air can pass in at least one direction is provided between the adjacent cells, both ends of the unit battery in the direction of arrangement of the cells being partly or wholly constrained by a holder, said assembled battery being fixed by a carrier, air being forcedly passed through the assembled battery by blowing and/or suction of air using a fan or a blower.

According to the above construction, since at least a part of the outermost part of the electrode group in the cell contacts with the container, the heat in the cell can be efficiently transferred to the container. Furthermore, since the whole or a part of both ends of the unit battery in the direction of arrangement of the cells is constrained by a holder, it is possible to inhibit the distortion of the container caused by increase of internal pressure of the cell or expansion of the electrode group.

Moreover, shifting of the cells in their position due to shock can be prevented. In addition, when the assembled battery comprising the unit batteries has such construction that air is forcedly passed therethrough by blowing and/or suction of air using a fan or a blower, air can be uniformly flowed through the space between the cells and dissipation of heat from each cell becomes uniform. As a result, temperature of the respective cells is uniform and scattering in capacity of the cells can be prevented. Thus, cycle life can be improved.

As explained above, by employing the above construction, the present invention can provide a unit battery and a battery system which are free from distortion or expansion of the container, are free from scattering in capacity of the cells and thus are excellent in cycle life.

The following examples, with particular reference to the drawing, will be set forth to illustrate the invention.

EXAMPLE 1

Figure 1B:
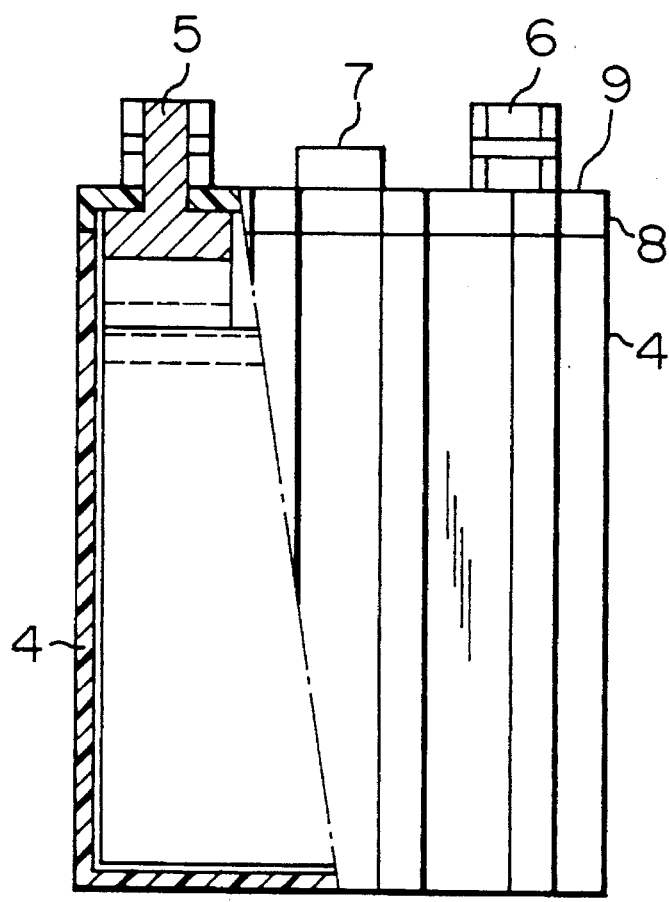
FIG. 1B is a front view of the same cell partly cut away and sectioned to reveal the interior.
Figure 1C:
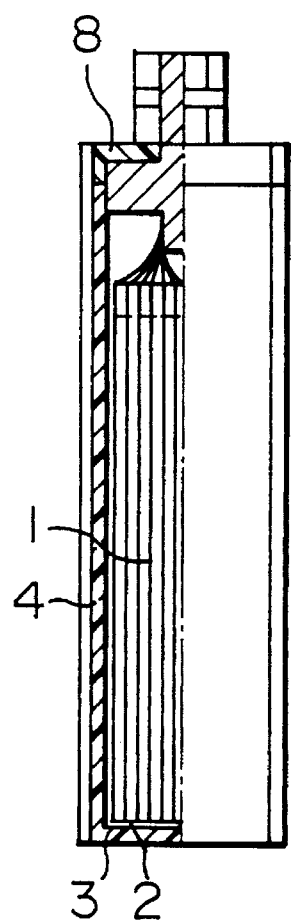
FIG. 1C is a side view of the same cell partly cut away and sectioned to reveal the interior.
Figure 2A:
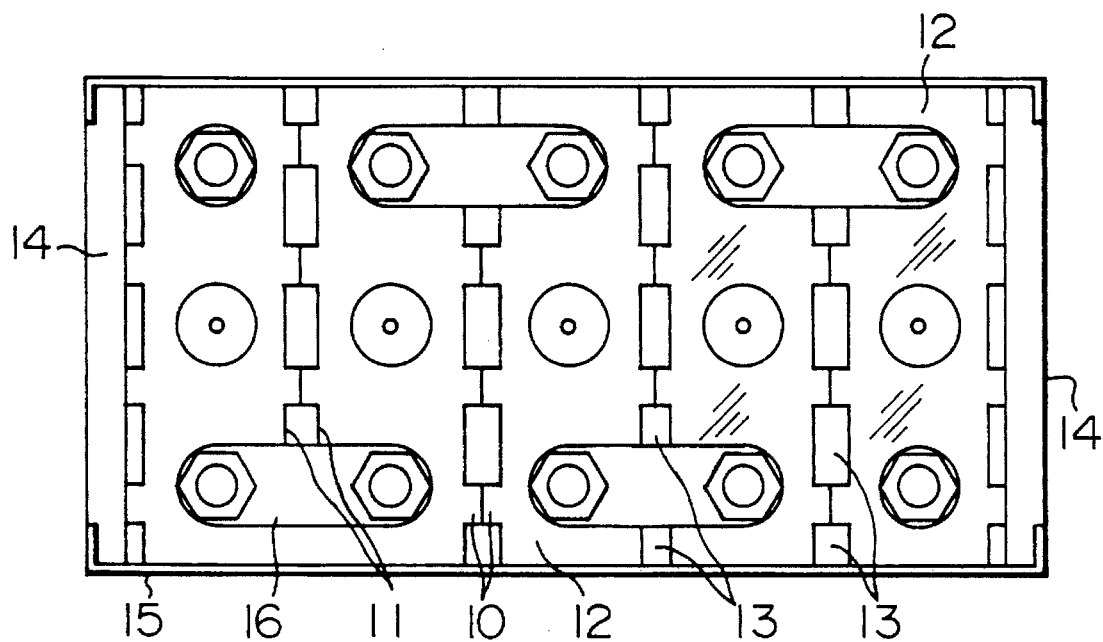
FIG. 2A is a top view of a unit battery of sealed alkaline storage battery made in the present invention.
Figure 2B:
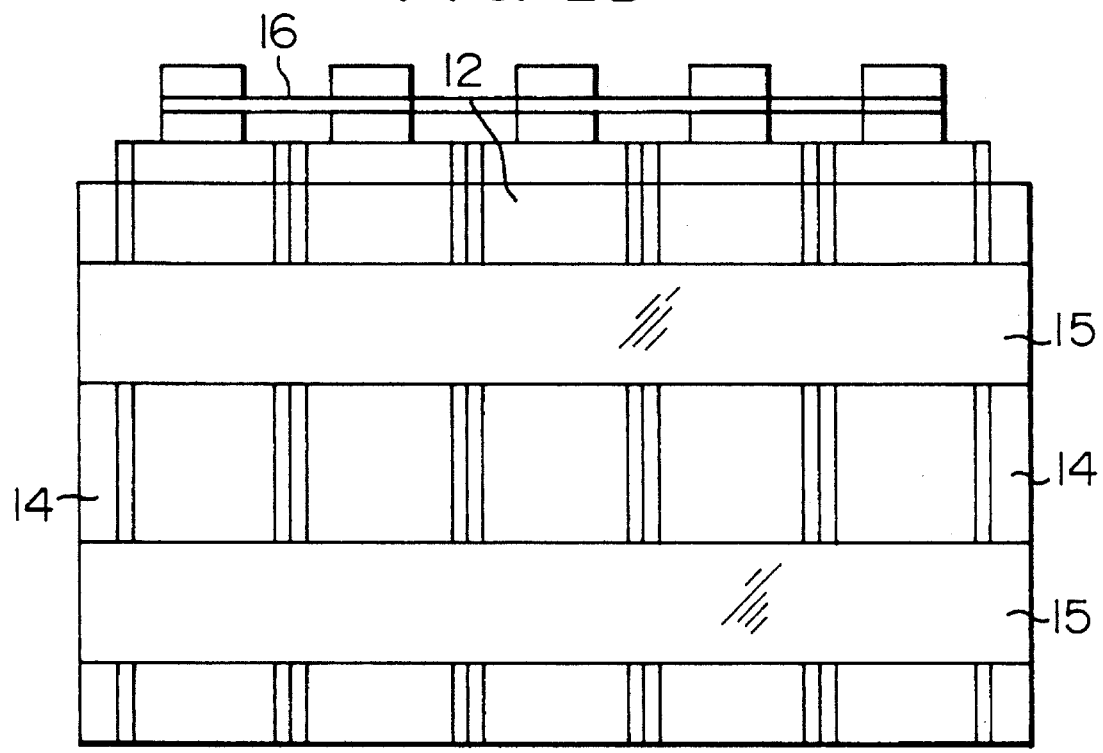
FIG. 2B is a side view of the same unit battery.

FIGS. 1A, 1B and 1C show the construction of the cell of sealed alkaline storage battery used in the present invention and FIGS. 2A and 2B show the construction of the unit battery of the present invention.

Electrode group 1 was produced in the following manner. Positive plate 2 was produced by filling an active material, nickel hydroxide powder, in a foamed nickel porous body and rolling and cutting the porous body to a given size to make a nickel positive electrode of 10 Ah in capacity per one plate. Negative plate 3 was produced by coating on a punching metal a hydrogen-storing alloy powder having a composition of $MmNi_{3.6}Co_{0.7}Mn_{0.4}Al_{0.4}$ capable of electrochemically occluding and releasing hydrogen together with a binder and rolling and cutting the coated punching metal to a given size to make a hydrogen-storing alloy negative electrode of 13 Ah in capacity per one plate. As shown in FIG. 1 each of these positive and negative plates was wrapped in bag separators. Ten positive plates wrapped with separators were alternated with eleven negative plates wrapped with separators to produce the electrode group 1. The electrode group 1 had a thickness of about 85–100% of the internal dimension of container 4. Positive electrode terminal 5 and negative electrode terminal 6 made of copper and nickel were connected to the electrode group 1 and the electrode group 1 was inserted into a black container 4 made of polypropylene.

Next, 180 cm$^3$ of an alkali electrolyte was filled therein. The opening of this container 4 was sealed by cap 8 provided with safety valve 7 (working pressure: 2–3 kg/cm$^2$) to make a cell 9. The outside of the container 4 had many projected portions 10 and dented portions 11 from the top to the bottom. The height of the projected portions 10 was 1.5 mm.

The cell 9 was subjected to initial charging and discharging (charging=10 A×15 hr, discharging=to 1.0 V at 20 A) and the electrode group 1 was expanded so that the outermost part of the electrode group was in contact with the container. Capacity of this cell 9 was regulated by the positive electrode and the cell capacity was 100 Ah.

Five cells 9 made in this way were connected in series to make a unit battery 12 of the present invention as shown in FIG. 2. This unit battery 12 had such a construction that the projected portions 10 provided outside the container 4 of the cells 9 contacted with each other and the dented portions 11 provided spaces 13 between the cells 9 from the top to the bottom as shown in FIG. 2A.

In the unit battery 12, the cells 9 of both ends were constrained by aluminum sheets 14 and iron bands 15 in the direction of arrangement of the cells. The cell voltage was 6 V.

For comparison, the following three unit batteries were produced.

Comparative Example 1

A unit battery was produced in the same manner as in Example 1 except that in the cell, the thickness of the electrode group was 75% of the size of the cell and the outermost part of the electrode group was not in contact with the container after the initial charging and discharging.

Comparative Example 2

A unit battery was produced in the same manner as in Example 1 except that the cells used had neither the dented portions nor the projected portions on the outside of the container, namely, the surface of the container was flat and the cells were spaced at an interval of 3 mm and the containers of the adjacent cells were not in contact with each other.

Comparative Example 3

A unit battery was produced in the same manner as in Example 1 except that the aluminum sheets and the iron bands were not used and the cells of both ends were not constrained.

The unit battery of Example 1 and the unit batteries of Comparative Examples 1, 2 and 3 were subjected to discharge capacity test and cycle life test. The discharge capacity test was conducted by charging he battery for 12 hours at 10 A, then allowing it to stand for 1 hour and discharging it to 5 V at 20 A. The discharge capacity of the unit battery was calculated using the discharge time before the voltage reached 5 V. The discharge capacity of the cell was calculated using the discharge time before the voltage reached 1 V. During charging, air was blown from the bottom of the battery through the spaces between the cells of the unit battery and between the aluminum sheet and the cell by a fan. The velocity of the air passing through the spaces 13 was 1.0 m/sec on the average. The environmental temperature was 20° C. The test results are shown in Table 1.

TABLE 1

|  | Unit battery | Cell 1 | Cell 2 | Cell 3 | Cell 4 | Cell 5 |
|---|---|---|---|---|---|---|
| The present invention | 98 Ah | 98 Ah 35° C. | 98 Ah 35° C. | 98 Ah 35° C. | 98 Ah 35° C. | 98 Ah 35° C. |
| Comparative Example 1 | 85 Ah | 88 Ah 42° C. | 86 Ah 44° C. | 85 Ah 44° C. | 85 Ah 44° C. | 87 Ah 42° C. |
| Comparative Example 2 | 82 Ah | 84 Ah 42° C. | 83 Ah 44° C. | 80 Ah 48° C. | 82 Ah 46° C. | 85 Ah 44° C. |
| Comparative Example 3 | 77 Ah | 81 Ah 50° C. | 78 Ah 52° C. | 76 Ah 54° C. | 77 Ah 53° C. | 80 Ah 51° C. |

The cycle life test was conducted by repeating the same charging and discharging conditions as in the discharge capacity test. The test results are shown in Table 2.

TABLE 2

|  | The present invention | Comparative Example 1 | Comparative Example 2 | Comparative Example 3 |
|---|---|---|---|---|
| Cycle life | Under continuation of 900th cycle | 540 cycles | 350 cycles | 320 cycles |

As can be seen from Table 1, the unit battery of the present invention had a discharge capacity of 98 Ah and a discharge capacity of 98% of the discharge capacity 100 Ah of the cell was obtained. On the other hand, the unit batteries of Comparative Examples 1, 2 and 3 had a discharge capacity of 85 Ah, 82 Ah and 77 Ah, respectively. Thus, there was obtained a capacity of only 77–85% of the discharge capacity 100 Ah of the cell. Table 2 also shows the discharge capacities of the cells 1–5 which constituted the unit battery. The cells 1 and 5 were placed at the both ends of the unit battery and the cell 3 was placed at the center of the unit battery. The cells 1–5 constituting the unit battery of the present invention showed the similar discharge capacities and they coincided with the characteristics of the unit battery. The heat generated from the electrode group or the like in the cells during the charging was uniformly and sufficiently dissipated by the air flowed between the cells from the bottom to the top and as a result, rising of the cell temperature was merely 15° C. over the environmental temperature That is, the excellent discharge capacity was obtained for the reasons that as shown in Table 1 the internal temperature of the cells constituting the unit battery at the time of charging was constant, namely, 35° C. and charging was performed sufficiently and uniformly under the temperature condition which causes no decrease of the charging efficiency of the nickel positive electrode in each of the cells. Furthermore, as shown in Table 2, the unit battery of the present invention did not show decrease in discharge capacity even after repetition of charging and discharging of 900 cycles and had excellent cycle life characteristics. In the case of the unit battery of Comparative Example 1, the cell was constructed in such a manner that the electrode group was not in contact with the container, and a space was formed between the container and the electrode. The gas present in the space is a mixture of oxygen, nitrogen and hydrogen and is small in heat conductivity. Therefore, the heat generated in the electrode group is hardly transferred to the container and the heat is dissipated with difficulty even if air is blown between the cells. As shown in Table 1, temperature at the end of charging of the cell constituting the unit battery of Comparative Example 1 was 42°–44° C. and was higher 7°–9° C. than that of the unit battery of the present invention. As a result, charging efficiency of the nickel positive electrode of each cell decreased and discharge capacity decreased to about 85 Ah. Furthermore, as shown in Table 2, in the case of this unit battery, after repetition of 540 cycles, the discharge capacity obtained was only 50% of the initial discharge capacity. It is considered that this is because since the cell temperature was higher by 7°–9° C., oxidation or corrosion of the hydrogen-storing alloy used in the negative electrode proceeded to cause deterioration in performance of negative electrode and decrease in discharge capacity. The unit battery of Comparative Example 2 consisted of cells having a flat outside of the container with no dented and projected portions on the outside of the container and the adjacent cells were spaced at an interval of 3 mm to allow air to pass therethrough, and the containers of the adjacent cells were not in contact with each other. As shown in Table 1, the discharge capacity of the unit battery was 82 Ah, which was smaller than that of the unit battery of the present invention. The reason is considered as follows. Owing to the expansion of the electrode group or increase of internal cell pressure at the time of charging, the containers were distorted to change the width of the spaces because the adjacent cells were not in contact with each other at projected portions and thus, the flowing of air was non-uniform. Therefore, even if air was blown between the cells, the heat was dissipated with difficulty and especially the temperature of the cell positioned at the center of the unit battery rose much due to the heat of the cells adjacent thereto. Moreover, the discharge capacity of each cell was 80–85 Ah and was not uniform. Furthermore, as shown in Table 2, in the case of this unit battery, after repetition of 350 cycles, the discharge capacity obtained was only 50% of the initial discharge capacity. It is considered that this is because the distortion of the container increased owing to the repetition of charging and discharging and the width of the spaces considerably decreased whereby the heat dissipation effect obtained by the air blowing decreased and the cell temperature rose to cause deterioration in performance of negative electrodes and decrease in discharge capacity. The unit battery of Comparative Example 3 was not constrained at the cells of both ends by aluminum sheets and iron bands in the direction of arrangement of the cells and distortion of the container due to expansion of the electrode group or increase of internal cell pressure at the time of charging could not be inhibited and expansion of the electrode occurred most conspicuously. Therefore, the contact area between the foamed nickel porous body or punching metal which was core material of the positive and negative electrodes and the active material of the positive and negative electrodes decreased and the electric conductivity decreased. When the electric conductivity of the positive and negative plates decreased, the charging efficiency of the cells decreased and quantity of the heat generated at the time of charging increased. As shown in Table 1, temperature at the end of charging of the cells constituting the unit battery of Comparative Example 3 was 50°–54° C. and was higher 15°–19° C. than that of the unit battery of the present invention. The discharge capacity was also low, namely, 76–81 Ah. Furthermore, as shown in Table 2, in the case of this unit battery, after repetition of 320 cycles, the discharge capacity obtained was only 50% of the initial discharge capacity. It is considered that this is because the repetition of charging and discharging caused expansion of the electrode group and decrease of electric conductivity of the positive and negative plates thereby to decrease charging efficiency and to increase the cell temperature and thus, performance of the negative electrode deteriorated and discharge capacity decreased.

In this Example, the unit battery consisted of 5 cells, but the number of the cells to be collected is suitably 5–40, considering supervision and maintenance and handling such as replacement of cells when an assembled battery is fabricated from the unit batteries. Furthermore, in this Example, the dented and projected portions were provided in vertical direction on the container, but the same effect can be obtained when they are provided in horizontal direction. In this Example, the color of the surface of the container was black. Black color or dark brown color close to black which is excellent in heat transferability is desired considering the heat dissipation efficiency of the electrode group.

Furthermore, in this Example, the cap and the container were made of polypropylene, but the same effect is also obtained when the container is made of a metal or a resin mainly composed of polypropylene with a material higher in heat conductivity than polypropylene, such as upper, nickel, iron, carbon, aluminum oxide or magnesium oxide provided inside the container. If the air blowing was not carried out during charging, the heat generated at the electrode group was not dissipated and the charging efficiency conspicuously decreased. Therefore it is preferred to blow air through the spaces between the cells at a velocity of at least 0.1 m/s. Even if air is blown at a velocity of higher than 5 m/s, the heat dissipation effect no longer increases and the velocity is preferably 0.1–5 m/s. The outermost part of the electrode group greatly affects the heat dissipation efficiency and is preferably a negative plate, a positive plate, a metal plate or a metallic porous body excellent in heat conductivity or a separator which covers them. The material of the holder used in the unit battery of this Example was iron and aluminum, but nickel can also be similarly used.

EXAMPLE 2

Unit batteries were produced in the same manner as in Example 1 except that thickness of the container through which air passed and width of the space between the cells were changed. The numbers of the produced batteries and the thickness of the container and the width of the space are shown in Table 3. These batteries were subjected to utilization test and cycle life test under the same conditions as in Example 1. The results are also shown in Table 3.

TABLE 3

| No. | Thickness of container | Width of space | Utilization | Cycle life |
|---|---|---|---|---|
| 1 | 0.5 mm | 3 mm | 94.8% | 550 cycles |
| 2 | 1 mm | 3 mm | 94.0% | 850 cycles |
| 3 | 3 mm | 3 mm | 93.5% | 900 cycles |
| 4 | 5 mm | 3 mm | 92.5% | 750 cycles |
| 5 | 6 mm | 3 mm | 88.0% | 600 cycles |
| 6 | 3 mm | 0.5 mm | 85.0% | 550 cycles |
| 7 | 3 mm | 1 mm | 91.5% | 700 cycles |
| 8 | 3 mm | 4 mm | 93.0% | 750 cycles |
| 9 | 3 mm | 5 mm | 90.1% | 600 cycles |

The battery No. 1 having a container thickness of 0.5 readily dissipated the heat since the thickness was thin and was high in utilization, but the container was distorted due to the insufficient container thickness against the internal cell pressure and thus, the cycle life was short. Furthermore, as for the battery No. 5 having a container thickness of 6 mm, the heat generated at the electrode group dissipated with difficulty owing to the great thickness of the container and the utilization decreased to 88% and the cycle life also shortened. Furthermore, this battery was not preferred from the point of volume energy density. From the above, the thickness of the container is preferably 1–5 mm. As for the battery No. 6 where the width of the space between the cells through which air passes was 0.5 mm, the heat generated at the electrode group dissipated with difficulty since the width of the space was narrow and the utilization was low, namely, 85% and the cycle life was also low. The battery No. 9 having a space width of 5 mm was low in utilization and the cycle life also shortened because the flow of air was laminar flow to reduce the heat dissipation effect. Thus, the width of the space is desirably 1–4 mm.

EXAMPLE 3

The same batteries as of Example 1 were produced using the unit battery of the sealed alkaline storage battery with changing the amount of electrolyte. The numbers of the batteries produced and the amount of the electrolyte are shown in Table 4. These batteries were subjected to the utilization test and the cycle life test under the same conditions as in Example 1. The result is are also shown in Table 4.

TABLE 4

| No. | Amount of electrolyte | Utilization | Cycle life |
|---|---|---|---|
| 10 | 120 cc | 88.2% | 430 cycles |
| 11 | 130 cc | 90.1% | 700 cycles |

TABLE 4-continued

| No. | Amount of electrolyte | Utilization | Cycle life |
|---|---|---|---|
| 12 | 200 cc | 93.5% | 900 cycles |
| 13 | 280 cc | 94.8% | 850 cycles |
| 14 | 290 cc | 95.0% | 600 cycles |

The battery No. 10 containing 120 cc of the electrolyte was insufficient in the amount of the electrolyte for nickel positive electrode and so, was low in both the utilization and the cycle life. The battery No. 14 containing 290 cc of the electrolyte was high in the utilization, namely, 95%, but inferior in the cycle life to the battery containing 280 cc of the electrolyte. This is because since the amount of the electrolyte was large, when the battery was charged at a current value of 10 A, absorption reaction of the oxygen gas at the negative electrode which was generated from the positive electrode during overcharge lowered and the gas or the electrolyte leaked from the safety valve, resulting in deterioration of the cycle life. Since the capacity of the battery Nos. 11–13 was 100 Ah, the amount of the electrolyte per 1 Ah was 1.3, 2.0 and 2.8 cc, respectively. Therefore, the amount of the electrolyte is preferably 1.3–2.8 cc/Ah. In this Example, a foamed nickel porous body having three-dimensional structure was used as the positive electrode, but the same effect can be obtained when a positive electrode comprising a metallic sheet having an active material held on both sides is used. Furthermore, in this Example, a punching metal of planar structure was used as the negative electrode but the same effect can be obtained when a metallic porous body of three-dimensional structure is used.

EXAMPLE 4

The same batteries as of Example 1 were produced by fitting safety valves of different working pressures to the unit batteries of sealed alkaline storage battery of Example 1. The numbers of the batteries produced and the working pressure of the safety valve are shown in Table 5. These batteries were subjected to the utilization test and the cycle life test under the same conditions as in Example 1. The results are also shown in Table 5.

TABLE 5

| No. | Working pressure of safety valve | Utilization | Cycle life |
|---|---|---|---|
| 15 | 0.5 kg/cm$^2$ | 88.2% | 320 cycles |
| 16 | 1.0 kg/cm$^2$ | 90.1% | 500 cycles |
| 17 | 3.0 kg/cm$^2$ | 93.5% | 900 cycles |
| 18 | 5.0 kg/cm$^2$ | 94.8% | 850 cycles |
| 19 | 6.0 kg/cm$^2$ | 85.0% | 600 cycles |

As for the battery No. 15 where the working pressure of the safety valve was 0.5 kg/cm$^2$, the safety valve worked early at the time of charging and deep charging was impossible and so the utilization decreased. In addition, gas or electrolyte leaked from the safety valve and the cycle life shortened. On the other hand, in the case of the battery No. 19 with a working pressure of the safety valve of 6.0 kg/cm$^2$, even if the internal pressure increased at the time of charging, the safety valve did not work. Therefore, the container expanded and was distorted to produce a space between the container and the electrode group and the heat gene rated in the electrode group was hardly dissipated to the outside.

Thus, the cell temperature during charging considerably rose and charging efficiency of the positive electrode decreased and the utilization was 85%. Furthermore, since the rise of the cell temperature accelerated deterioration of performance of the negative electrode active material, the cycle life decreased to 600 cycle. From the above, the working pressure of safety valve is desirably 1.0–5.0 kg/cm$^2$.

EXAMPLE 5

Five cells of sealed alkaline storage battery having having containers of flat outside with no projected and dented portions as shown in Comparative Example 2 were stacked with resin spacers provided therebetween and provided with vertical many projected and dented portions on both sides and with a spacer having vertical many projected and dented portions on one side being provided on the outside of the outermost cells so that the side of the spacer provided with the projected and dented portions contacted with the outside of the outermost cells. These five cells were connected in series to obtain a unit battery. The height of the projected portion was 1.5 mm and the whole thickness of the spacers was 4 mm. This unit battery had such a construct ion that vertical spaces were provided between the cell and the spacer by the projected and dented portions provided on the spacer. Furthermore, this unit battery had such a construction that the cells of both ends were constrained in the direction of arrangement of the cells by aluminum sheets and iron bands as in Example 1. Battery voltage was 6 V.

Comparative Example 4

A unit battery was produced in the same manner as in Example 5 except that the thickness of the electrode group was 75% of the thickness of the cell and the outermost part of the electrode group was not in contact with the container after initial charging and discharging.

Comparative Example 5

A unit battery was produced in the same manner as in Example 5 except that the spacers had no projected and dented portions on their surface and the interval was not fixed.

Comparative Example 6

A unit battery was produced in the same manner as in Example 5 except that the aluminum sheets and the iron bands were not used and the cells of the both ends were not constrained.

These batteries were subjected to the tests under the same conditions as in Example 1. The results are shown in Table 6.

TABLE 6

|  | Unit battery | Cell 1 | Cell 2 | Cell 3 | Cell 4 | Cell 5 |
| --- | --- | --- | --- | --- | --- | --- |
| The present invention | 98 Ah | 98 Ah 35° C. | 98 Ah 35° C. | 98 Ah 35° C. | 98 Ah 35° C. | 98 Ah 35° C. |
| Comparative Example 4 | 85 Ah | 88 Ah 42° C. | 86 Ah 44° C. | 85 Ah 44° C. | 85 Ah 44° C. | 87 Ah 42° C. |
| Comparative Example 5 | 82 Ah | 84 Ah 42° C. | 83 Ah 44° C. | 80 Ah 48° C. | 82 Ah 46° C. | 85 Ah 44° C. |
| Comparative Example 6 | 77 Ah | 81 Ah 50° C. | 78 Ah 52° C. | 76 Ah 54° C. | 77 Ah 53° C. | 80 Ah 51° C. |

The cycle life test was conducted by repeating the same charging and discharging conditions as employed for obtaining the discharge capacity. The results are shown in Table 7.

TABLE 7

|  | The present invention | Comparative Example 4 | Comparative Example 5 | Comparative Example 6 |
| --- | --- | --- | --- | --- |
| Cycle life | Under continuation of 900th cycle | 540 cycles | 350 cycles | 320 cycles |

As can be seen from Table 6, the unit battery of the present invention had a discharge capacity of 98 Ah and thus a discharge capacity of 98% of the discharge capacity 100 Ah of the cell was obtained. On the other hand, the unity batteries of Comparative Examples 4, 5 and 6 had discharge capacity of 85 Ah, 82 Ah and 77 Ah, respectively. That is, there were obtained a capacity of only 77–85% of the discharge capacity 100 Ah of the cell. Table 7 also shows the discharge capacities of the cells 1–5 which constituted the unit battery. The cells 1 and 5 were positioned at the both ends of the unit battery and the cell 3 was positioned at the center of the unit battery. The cells 1–5 constituting the unit battery of the present invention showed the similar discharge capacities and they coincided with the characteristics of the unit battery. The heat generated from the electrode group or the like in the cells during charging was uniformly and sufficiently dissipated by the air flowing between the cells from the bottom to the top and as a result, the cell temperature rose merely 15° C. over the environmental temperature. That is, the excellent discharge capacity was obtained for the reason that as shown in Table 6 the internal temperature of the cells constituting the unit battery at the time of charging was constant, namely, 35° C. and charrging was performed sufficiently and uniformly under the temperature condition which causes no decrease of the charging efficiency of the nickel positive electrodes in each of the cells. Furthermore, as shown in Table 7, the unit battery of the present invention did not show decrease in discharge capacity even after repetition of charging and discharging of 900 cycles and had excellent cycle life characteristics. In the unit battery of Comparative Example 4, the cell was constructed in such a manner that the electrode group was not in contact with the container, and a space was formed between the container and the electrode. The gas present in the space is a mixture of oxygen, nitrogen and hydrogen and is small in heat conductivity. Therefore the heat generated in the electrode group was hardly transferred to the container and the heat was dissipated with difficulty even if air is allowed to flow between the cells. As shown in Table 6, temperature at the end of charging of the cells constituting the unit battery of Comparative Example 4 was 42°–44° C. and was higher 7°–9° C. than that of the unit battery of the present invention. As a result, charging efficiency of the nickel positive electrodes of each cell decreased and discharge capacity decreased to about 85 Ah. Futhermore, as shown in Table 7, as for this unit battery, after repetition of 540 cycles, the discharge capacity obtained was only 50% of the initial discharge capacity. It is considered that this is because since the cell temperature was higher by 7°–9° C., oxidation or corrosion of the hydrogen-storing alloy used for the negative electrodes proceeded to cause deterioration in performance of the negative electrode and decrease in discharge capacity. The unit battery of Comparative Example 5 consisted of cells in which spacers having no dented and projected portions on the outside were used, and the adjacent cells were spaced at an interval of 3 mm to allow air to pass therethrough, and the containers of the adjacent cells were not in contact with the spacers. As shown in Table 6, the discharge of the unit battery was 82 Ah, which was smaller than that of the unit batteries of the present invention. The reason is considered as follows. Owing to the expansion of the electrode group or increase of internal cell pressure at the time of charging, the containers were distorted to change the width of the spaces because the adjacent cells did not contact with each other through the projected portions of the spacers and thus, the flowing of air was non-uniform. Therefore, even if air was blown between the cells, the heat was dissipated with difficulty and especially the temperature of the cell positioned at the center of the unit battery rose considerably due to the heat of the cells adjacent thereto. Moreover, the discharge capacity of each cell was 80–85 Ah and was not uniform. Furthermore, as shown in Table 7, as for this unit battery, after repetition of 350 cycles, the discharge capacity obtained was only 50% of the initial discharge capacity. It is considered that this is because the distortion of the container increased owing to the repetition of charging and discharging and the width of the spaces considerably decreased whereby the heat dissipation effect provided by the air blowing decreased and the cell temperature rose to cause deterioration in performance of the negative electrode and decrease in discharge capacity. The unit battery of Comparative Example 6 was not constrained at the cells of both ends by aluminum sheets and iron bands in the direction of arrangement of the cells, and distortion of the container due to expansion of the electrode group or increase of internal cell pressure at the time of charging could not be inhibited and expansion of the electrode became extremely conspicuous. Therefore, the contact area between the foamed nickel porous body or punching metal which was core material of the positive and negative electrodes and the active material of the positive and negative electrodes decreased and the electric conductivity decreased. When the electric conductivity of the positive and negative plates decreased the charging efficiency of the cells decreased and quantity of the heat generated at the time of charging increased.

As shown in Table 6, temperature at the end of charging the cells constituting the unit battery of Comparative Example 6 was 50°–54° C. and was higher 15°–19° C. than that of the unit battery of the present invention. The discharge capacity was also low, namely, 76–81 Ah. Furthermore, as shown in Table 7, as for this unit battery, after repetition of 320 cycles, the discharge capacity obtained was only 50% of the initial discharge capacity. It is considered that this is because the repetition of charging and discharging caused expansion of the electrode group and decrease of electric conductivity of the positive and negative plates thereby to bring about decrease in charging efficiency and increase in the cell temperature and thus, performance of the electrode deteriorated and discharge capacity decreased.

In this Example, the unit battery consisted of 5 cells, and the number of the cells is suitably 5–40, considering supervision and maintenance and handling such as replacement of cells when an assembled battery is fabricated using the unit batteries. Furthermore, in this Example, the dented and projected portions provided on the spacers were in vertical direction, but the same effect can be obtained when they are provided in horizontal direction. In this Example, the dented and projected portions were provided on the outside of the spacers, the same effect can also be obtained by using spacers having spaces through which air can pass, on the inside with outside being flat. Furthermore, the same effect can be obtained when the spacers are made of a metal. In this Example, the color of the surface of the container and the spacers was black. Black color or dark brown color close to black which is excellent in heat transferability is desirable considering the heat dissipation efficiency of the electrode group. Furthermore, in this Example, the cap and the container were made of polypropylene, but the same effect is obtained when the container is made of a metal or a resin mainly composed of polypropylene with a material higher in heat conductivity than polypropylene, such as copper, nickel, iron, carbon, aluminum oxide or magnesium oxide being provided inside the container. If the air blowing was not carried out during charging, the heat generated at the electrode group was not dissipated and the charging efficiency conspicuously decreased. Therefore, it is preferred to blow air through the spaces between the cells at a velocity of at least 0.1 m/s. Even if air is blown at a velocity of higher than 5 m/s, the heat dissipation effect no longer increases, and so the velocity is preferably in the range of 0.1–5 m/s The outermost part of the electrode group greatly affects the heat dissipation efficiency and is preferably a negative plate, a positive plate, a metal plate or metallic porous body excellent in heat conductivity or a separator which covers them. The material of the holder used in the unit battery of this Example was iron and aluminum, but nickel can also be used with similar results.

EXAMPLE 6

The same unit batteries of sealed alkaline storage battery as of Example 5 were produced except that thickness of the container of the cells through which air passed and thickness of the spacers were changed. The No. of the produced batteries and thickness of the container and the spacers are shown in Table 8. These batteries were subjected to the utilization test and the cycle life test under the same condition as in Example 1. The results are also shown in Table 8.

TABLE 8

| No. | Thickness of container | Thickness of spacer | Utilization | Cycle life |
| --- | --- | --- | --- | --- |
| 20 | 0.5 mm | 4 mm | 94.8% | 550 cycles |
| 21 | 1 mm | 4 mm | 94.0% | 850 cycles |
| 22 | 3 mm | 4 mm | 93.5% | 900 cycles |
| 23 | 5 mm | 4 mm | 92.5% | 750 cycles |
| 24 | 6 mm | 4 mm | 88.0% | 600 cycles |
| 25 | 3 mm | 0.5 mm | 85.0% | 550 cycles |
| 26 | 3 mm | 1 mm | 91.5% | 700 cycles |
| 27 | 3 mm | 5 mm | 93.0% | 750 cycles |
| 28 | 3 mm | 6 mm | 90.1% | 600 cycles |

From the battery No. 20 having a container thickness of 0.5 mm the heat was readily dissipated since the thickness was thin and the utilization was high, but the container was distorted due to the insufficient container thickness against the internal cell pressure and thus, the cycle life was short. Furthermore, as for the battery No. 24 having a container thickness of 6 mm, the heat generated at the electrode group was dissipated with difficulty owing to the great thickness of the container and the utilization decreased to 88% and the cycle life also shortened. From the above, the thickness of the container is preferably 1–5 mm. As for the battery No. 25 where the thickness of the spacers was 0.5 mm, the heat generated at the electrode group dissipated with difficulty since the width of the space was narrow and the utilization lowered to 85% and the cycle life also decreased. The battery No. 28 having a thickness of the spacer of 6 mm was low in utilization and the cycle life also shortened because the flow of air was laminar flow to reduce the heat dissipation effect. Thus, the thickness of the spacers is desirably 1–5 mm.

EXAMPLE 7

The same batteries as of Example 5 were produced using the unit batteries of the sealed alkaline storage battery of Example 5 with changing the amount of electrolyte. The No. of the batteries produced and the amount of the electrolyte are shown in Table 9. These batteries were subjected to the utilization test and the cycle life test under the same conditions as in Example 1. The results are also shown in Table 9.

TABLE 9

| No. | Amount of electrolyte | Utilization | Cycle life |
| --- | --- | --- | --- |
| 29 | 120 cc | 88.2% | 430 cycles |
| 30 | 130 cc | 90.1% | 700 cycles |
| 31 | 200 cc | 93.5% | 900 cycles |
| 32 | 280 cc | 94.8% | 850 cycles |
| 33 | 290 cc | 95.0% | 600 cycles |

The battery No. 29 containing 120 cc of the electrolyte was insufficient in the amount of the electrolyte for the nickel positive electrode and so, was low in both the utilization and the cycle life. The battery No. 33 containing 290 cc of the electrolyte was good in the utilization, namely, 95%, but inferior in the cycle life to the battery containing 280 cc of the electrolyte. This is because since the amount of the electrolyte was large, when the battery was charged at a current value of 10 A, absorption reaction of the oxygen gas at the negative electrode which was generated from the positive electrode during overcharge was insufficient end the gas or the electrolyte leaked from the safety valve, resulting in deterioration of the cycle life. Since the capacity of the battery Nos. 30–32 was 100 Ah, the amount of the electrolyte per 1 Ah was 1.3, 2.0 and 2.8 cc, respectively. Therefore, the amount of the electrolyte is preferably 1.0–2.8 cc/Ah. In this Example, a foamed nickel porous body having three-dimensional structure was used as the positive electrode, but the same effect can be obtained when a positive electrode comprising a metallic sheet having an active material held on both sides is used. Furthermore, in this Example, a punching metal of planar structure was used as the negative electrode, but the same effect can be obtained when a metallic porous body of three-dimensional structure is used.

EXAMPLE 8

The same batteries as of Example 5 was produced by fitting safety valves of different working pressures to the unit batteries of sealed alkaline storage battery of Example 5. The No. of the batteries produced and the working pressure of the safety valve are shown in Table 10. These batteries were subjected to the utilization test and the cycle life test under the same conditions as in Example 1. The results are also shown in Table 10.

TABLE 10

| No. | Working pressure of safety valve | Utilization | Cycle life |
| --- | --- | --- | --- |
| 34 | 0.5 kg/cm$^2$ | 88.2% | 320 cycles |
| 35 | 1.0 kg/cm$^2$ | 90.1% | 500 cycles |
| 36 | 3.0 kg/cm$^2$ | 93.5% | 900 cycles |
| 37 | 5.0 kg/cm$^2$ | 94.8% | 850 cycles |
|    | 6.0 kg/cm$^2$ | 85.0% | 600 cycles |

As for the battery No. 34 where the working pressure of the safety valve was 0.5 kg/cm$^2$, the safety valve worked early at the time of charging and deep charging was impossible and so the utilization decreased. In addition, gas or electrolyte leaked from the safety valve and the cycle life shortened. On the other hand, as for the battery No. 38 with a working pressure of the safety valve of 6.0 kg/cm$^2$, even if the internal pressure increased at the time of charging, the safety valve did not work and the container expanded and was distorted to produce a space between the container and the electrode group and the heat generated in the electrode group was hardly dissipated to the outside. Thus, the cell temperature during charging considerably rose and charging efficiency of the positive electrode decreased and the utilization was 85%. Furthermore, since the rise of the cell temperature accelerates deterioration of performance of the negative electrode active material, the cycle life decreased to 600 cycles. From the above, the working pressure of safety valve is desirably 1.0–5.0 kg/cm$^2$.

EXAMPLE 9

Sixteen collected batteries (unit batteries) of the cells constrained by holders as shown in Example 1 were arranged in the form of a square of 4×4 and were connected electrically in series using a flexible knitted wire to fabricate an assembled battery, which was fixed at a carrier through a rubber as a vibration absorber to form a sealed alkaline storage battery system. This system was mounted on an electric car. There were provided spaces through which air flows below the carrier and above the assembled battery, and an intake vent and an exhaust vent were provided at the respective spaces and a fan was also provided.

The air sucked by the lower fan and introduced from the intake vent provided under the carrier passed through the spaces formed between the cells and the unit batteries placed at intervals by the projected and dented portions or the holders to reach the part above the assembled battery and then the air was discharged from the exhaust vent to the outside of the battery system. The respective unit batteries were constrained before and behind and left and right by the projections provided at the carrier and were also constrained upwardly and downwardly by the metallic rods provided above the unit batteries. The velocity of the flowing air was 1.0 m/s. The temperature of the air was 20° C. The system voltage was 96 V.

As comparative examples, the following three systems were produced.

Comparative Example 7

The same sealed alkaline storage battery system as of Example 9 was produced in the same manner as in Example 9 except that the thickness of the electrode group in the cell was 75% of the thickness of the cell and the outermost part of the electrode group in the cells was not in contact with the container after initial charging and discharging.

Comparative Example 8

The same sealed alkaline storage battery system as of Example 9 was produced in the same manner as in Example 9 except that the container of the cells had no projected and dented portions on the outside and had flat surface, the cells were spaced at an interval of 3 mm and that the unit battery was produced in which the containers of the adjacent cells were not in contact with each other.

Comparative Example 9

The same sealed alkaline storage battery system as of Example 9 was produced in the same manner as in Example 9 except that the aluminum sheets and the iron bands were not used and that unit batteries were produced in such a manner that the cells of the both ends were not constrained in the direction of arrangement of the cells.

The system of the present invention and the systems of Comparative Examples 7, 8 and 9 were subjected to discharge capacity test and cycle life test. The discharge capacity test was conducted by charging the system at 10 A for 12 hours, then allowing it to stand for 1 hour and then discharging it to 20 V at 20 A. The discharge capacity of the assembled battery was calculated using the discharging time required for the voltage reaching 80 V. Five unit batteries were selected and the discharge capacity was calculated using the discharge time required for the voltage reaching 5 V. The unit batteries 1 and 5 were positioned at the corners of the assembled battery, the unit batteries 2 and 4 were positioned at the center of outer periphery, and the unit battery 3 was positioned at the center of the assembled battery. During the charging, air was blown into the spaces between the cells in each unit battery and between the aluminum sheets and the cells by a fan provided under the carrier. The velocity of the air passing through the spaces was 1.0 m/sec on an average. Environmental temperature was 20° C. The test results are shown in Table 11.

TABLE 11

|  | Unit battery | Unit battery 1 | Unit battery 2 | Unit battery 3 | Unit battery 4 | Unit battery 5 |
| --- | --- | --- | --- | --- | --- | --- |
| The present invention | 98 Ah | 98 Ah 35° C. | 98 Ah 35° C. | 98 Ah 35° C. | 98 Ah 35° C. | 98 Ah 35° C. |
| Comparative Example 7 | 85 Ah | 88 Ah 42° C. | 86 Ah 44° C. | 85 Ah 44° C. | 85 Ah 44° C. | 87 Ah 42° C. |
| Comparative Example 8 | 82 Ah | 84 Ah 42° C. | 83 Ah 44° C. | 80 Ah 48° C. | 82 Ah 46° C. | 85 Ah 44° C. |
| Comparative Example 9 | 77 Ah | 81 Ah 50° C. | 78 Ah 52° C. | 76 Ah 54° C. | 77 Ah 53° C. | 80 Ah 51° C. |

The cycle life test was conducted by repeating the same charging and discharging conditions as employed for obtaining the discharge capacity. The results are shown in Table 12.

TABLE 12

|  | The present invention | Comparative Example 7 | Comparative Example 8 | Comparative Example 9 |
| --- | --- | --- | --- | --- |
| Cycle life | Under continuation of 900th cycle | 540 cycles | 350 cycles | 320 cycles |

As can be seen from Table 11, the assembled battery of the present invention had a discharge capacity of 98 Ah and thus a discharge capacity of 98% of the discharge capacity 100 Ah of the cell was obtained. On the other hand, the assembled batteries of Comparative Examples 7, 8 and 9 had a discharge capacity of 85 Ah, 82 Ah and 77 Ah, respectively. Thus, the capacity obtained was only 77–85% of the discharge capacity 100 Ah of the cell. Table 11 also shows the discharge capacities of the unit batteries 1–5 which constituted the assembled battery. The unit batteries 1 and 5 were positioned at the corners of the assembled battery and the unit battery 3 was positioned at the center of the assembled battery. The unit batteries 1–5 constituting the assembled battery of the present invention showed the similar discharge capacities and they coincided with the characteristics of the assembled battery. This is for the following reason. The heat generated from the electrode group or the like in each unit battery during charging was uniformly and sufficiently dissipated by the air flowing between the unit batteries from the bottom to the top and as a result, the rise of the unit battery temperature was at most 15° C. over the environmental temperature. That is, the excellent discharge capacity was obtained for the reason that as shown in Table 11 the internal temperature of the unit batteries constituting the assembled battery at the time of charging was constant, namely, 35° C. and charging was performed sufficiently and uniformly under the temperature condition which causes no decrease of the charging efficiency of the nickel positive electrode in each of the unit batteries. Furthermore, as shown in Table 12, the assembled battery of the present invention did not show decrease in discharge capacity even after repetition of charging and discharging of 900 cycles and had excellent cycle life characteristics. As for the assembled battery of Comparative Example 7, the cell was constructed in such a manner that the electrode group was not in contact with the container and so a space was formed between the container and the electrode. The gas present in the space is a mixture of oxygen, nitrogen and hydrogen and is small in heat conductivity. Therefore, the heat generated in the electrode group was transferred with difficulty to the container and the heat was dissipated with difficulty even if air was blown between the cells. As shown in Table 11, temperature at the end of charging of the unit batteries constituting the assembled battery of Comparative Example 7 was 42°–44° C. and was higher 7°–9° C. than that of the assembled battery of the present invention. As a result, charging efficiency of the nickel positive electrode of each unit battery decreased and discharge capacity decreased to about 85 Ah. Furthermore, as shown in Table 12, in the case of this assembled battery, after repetition of 540 cycles, the discharge capacity obtained was only 50% of the initial discharge capacity.

It is considered that this is because since the battery temperature was higher by 7°–9° C., oxidation or corrosion of the hydrogen-storing alloy used for the negative electrode proceeded to cause deterioration in performance of the negative electrode and decrease in discharge capacity.

As for the assembled battery of Comparative Example 8, the unit batteries consisted of the cells the container of which had a flat outside with no dented and projected portions and the adjacent cells were spaced at an interval of 3 mm to allow air to pass therethrough and the containers of the adjacent cells were not in contact with each other. As shown in Table 11, the discharge capacity of the assembled battery was 82 Ah, which was smaller than that of the assembled battery of the present invention.

The reason is considered as follows. Owing to the expansion of the electrode group or increase of internal cell pressure at the time of charging, the containers were distorted to change the width of the spaces because the adjacent cells did not contact with each other through the projected portions on the outside of the containers, and consequently the flowing of air was non-uniform. Therefore, even if air was blown between the cells, the heat was dissipated with difficulty and especially the temperature of the unit battery positioned at the center of the assembled battery rose considerably due to the heat of the cells adjacent thereto. Moreover, the discharge capacity of each unit battery was 80–85 Ah and was not uniform. Furthermore, as shown in Table 12, in the case of this assembled battery, after repetition of 350 cycles, the discharge capacity obtained was only 50% of the initial discharge capacity. It is considered that this is because the distortion of the container increased owing to the repetition of charging and discharging and the width of the spaces considerably decreased whereby the heat dissipation effect provided by the blowing of air decreased and the cell temperature rose to cause deterioration in performance of the negative electrode and decrease in discharge capacity. The assembled battery of Comparative Example 9 was constructed in such a manner hat the cells of the both ends were not constrained by aluminum sheets and iron bands in the direction of arrangement of the cells, and distortion of the container due to expansion of the electrode group or increase of internal cell pressure at the time of charging could not be inhibited and expansion of the electrode group was most conspicuous. Therefore, the contact area between the foamed nickel porous body or punching metal which was core material of the positive and negative electrodes and the active material of the positive and negative electrodes decreased and the electric conductivity decreased. When the electric conductivity of the positive and negative plates decreased, the charging efficiency of the cells decreased and quantity of the heat generated at the time of charging increased. As shown in Table 11, temperature at the end of charging of the unit batteries constituting the assembled battery of Comparative Example 9 was 50°–54° C. and was higher 15°–19° C. than that of the assembled battery of the present invention. The discharge capacity was also low, namely, 76–81 Ah. Furthermore, as shown in Table 12, in the case of this assembled battery, after repetition of 320 cycles, the discharge capacity obtained was only 50% of the initial discharge capacity.

It is considered that this is because the repetition of charging and discharging caused expansion of the electrode group and decrease of electric conductivity of the positive and negative plates, which brought about decrease in charging efficiency and increase in the cell temperature and thus, performance of the negative electrode deteriorated and discharge capacity decreased.

In this Example, the assembled battery consisted of 16 unit batteries connected in series, but depending on the apparatuses in which the battery is used, the similar system can be constructed by connecting 2 or more unit batteries in series, in parallel or in combination of them. Furthermore, in this Example, rubber was used as the vibration absorber, but a spring can also be used to obtain the similar effect. Moreover, in this Example, as the cells and the unit batteries, there were used those which had the container having the dented and projected portions on the outside as shown in Example 1, but the similar sealed alkaline storage battery system can be obtained by using nit batteries provided with spacers having the dented and projected portions on the surface between the cells as shown in Example 5. Further, in this Example, a fan was used for blowing of air, but a blower can be used to obtain the same effects and in addition, the similar effect can be obtained when the direction of the air flow between the cells is from the top to the bottom. Therefore, according to the sealed alkaline storage battery system used in this Example, the similar effect can be obtained regardless of the direction of the flowing of air, namely, regardless of whether the fan or the blower carries out suction or exhaustion or combination thereof by providing a plurality of the fan and the blower. Unless the blowing of air was carried out during the charging, the heat generated from the electrode group was not dissipated and the charging efficiency markedly decreased. Therefore, it is desired to carry out blowing of air through the space between the cells at 0.1 m/s or more. Furthermore, in this Example, constraint was carried out in up and down direction by a metallic rod from the above, but the similar effect can be obtained using a belt made of a fabric.

EXAMPLE 10

The same systems as of Example 9 were produced using the assembled battery of the sealed alkaline storage battery system explained in Example 9 with changing the amount of the electrolyte. The No. of the produced assembled batteries and the amount of the electrolyte are shown in Table 13. These assembled batteries were subjected to the utilization test and the cycle life test under the same conditions as in Example 9. The results are also shown in Table 13.

TABLE 13

| No. | Amount of electrolyte | Utilization | Cycle life |
| --- | --- | --- | --- |
| 39 | 120 cc | 88.2% | 430 cycles |
| 40 | 130 cc | 90.1% | 700 cycles |
| 41 | 200 cc | 93.5% | 900 cycles |
| 42 | 280 cc | 94.8% | 850 cycles |
| 43 | 290 cc | 95.0% | 600 cycles |

The assembled battery No. 39 containing 120 cc of the electrolyte was insufficient in the amount of the electrolyte for the nickel positive electrode and so, was inferior in both the utilization and the cycle life. The assembled battery No. 43 containing 290 cc of the electrolyte was good in the utilization, namely, 95%, but inferior in the cycle life to the battery containing 280 cc of the electrolyte. This is because since the amount of the electrolyte was large, when the battery was charted at a current value of 10 A, absorption reaction of the oxygen gas at the negative electrode which was generated from the positive electrode during overcharge was insufficient and the gas or the electrolyte leaked from the safety valve, resulting in deterioration of the cycle life. Since the capacity of the battery Nos. 40–42 was 100 Ah, the amount of the electrolyte per 1 Ah was 1.3, 2.0 and 2.8 cc, respectively. Therefore, the amount of the electrolyte is preferably 1.0–2.8 cc/Ah. In this Example, a foamed nickel porous body having three-dimensional structure was used as the positive electrode, but the same effect can be obtained when a positive electrode comprising a metallic sheet having an active material held on both sides is used. Furthermore, in this Example, a punching metal of planar structure was used as the negative electrode, but the same effect can be obtained when a metallic porous body of three-dimensional structure is used.

EXAMPLE 11

The sealed alkaline storage battery system of Example 9 of the present invention was subjected to the same test as in Example 9 with changing the temperature of the air passing through the space. The No. of the assembled batteries produced and the temperature of the air are shown in Table 14. These assembled batteries were subjected to the utilization test and the cycle life test under the same conditions as in Example 9. The results are also shown in Table 14.

TABLE 14

| No. | Temperature of air | Utilization | Cycle life |
| --- | --- | --- | --- |
| 44 | −30° C. | 80.2% | 430 cycles |
| 45 | −20° C. | 92.1% | 650 cycles |
| 46 | 0° C. | 94.0% | 850 cycles |
| 47 | 20° C. | 93.5% | 900 cycles |
| 48 | 50° C. | 90.8% | 750 cycles |
| 49 | 60° C. | 85.0 | 550 cycles |

In the case of the assembled battery No. 44 where the temperature of the air was −30° C., both the utilization and the cycle life decreased due to the partial coagulation of the electrolyte. In the case of the assembled battery No. 49 where the temperature of the air was 60° C., the heat dissipation effect due to the blowing of air did not increase since the temperature of the passing air was high, and charging efficiency decreased to cause decrease of both the utilization and the cycle life. The assembled battery Nos. 45–48 were relatively good in utilization and cycle life. From the above, the temperature of the air is desirably −20°–50° C.

As explained above, according to the present invention, since at least a part of the outermost portion of the electrode group in each cell contacts with the container, each cell contacts with the adjacent cell at at least a part of their containers and the unit battery has such a construction that it is constrained by the holders at the whole surface or a part of the both ends in the direction of arrangement of the cells and there are provided spaces between the respective cells through which air can pass in at least one direction distortion of the container due to expansion of electricity generating elements caused by repetition of charging and discharging and expansion of the container due to increase of internal pressure of the cell can be inhibited. When the force of expansion of the electricity generating elements in the cells generated by repetition of charging and discharging is exerted in the thickness direction of the electricity generating element, the force is exerted on the container in the same direction to reduce the interval between the cells. As a result, the passing of air becomes difficult, bringing about problems in various cell characteristics and reliability. However, when the construction of the present invention is employed, since the electricity generating element contacts with the container and the adjacent cells contact with each other partially at their containers and the interval is fixed and furthermore, the unit battery is constrained by holders in the direction of arrangement of the cells, distortion of the container does not occur because the cells and the unit batteries are fixed even when the expansion force is exerted in the thickness direction of the electricity generating element. This is the same when expansion of the container occurs due to increase in the internal pressure of the cells. Furthermore, no distortion of the container occurs due to the similar effect also when the interval between the adjacent cells is fixed by inserting a spacer therebetween in the unit battery. Accordingly, it becomes possible to pass the air always uniformly between the cells at the time of charging or discharging and thus, a unit battery excellent in heat dissipation effect can be provided.

Next, there is provided a sealed alkaline storage battery system using an assembled battery made by combining a plurality of collected batteries (unit batteries) consisting of the cells each of which comprises a container in which an electrode group consisting of a plurality of positive plates and a plurality of negative plates with separators provided between the adjacent plates and an alkali electrolyte are inserted and which is sealed with a cap provided with a safety valve and by electrically connecting the cells and the unit batteries. At least a part of the outermost portion of the electrode group in the cell contacts with the container and the adjacent cells have a space therebetween through which air can pass in at least one direction and the unit battery is constrained by holders at a part or the whole surface of the both ends in the direction of arrangement of the cells, and the assembled battery is fixed at a carrier and air is forcedly passed through the assembled battery by suction or exhaustion or both of them using a fan or a blower.

According to the above construction, since at least a part of the outermost portion of the electrode group in the cell contacts with the container, the heat in the cell can be efficiently transferred to the container. Furthermore, since the unit battery is constrained by holders at the whole surface or a part of the both ends in the direction of arrangement of the cells, distortion of the container caused by increase of the cell internal pressure or expansion of the electrode group can be inhibited. Moreover, shifting of the cells due to vibration can be inhibited. Furthermore, when the assembled battery comprising these unit batteries is constructed so that air is forcedly passed therethrough by suction or exhaustion or both of them using a fan or a blower, the air can be uniformly passed through the spaces between the cells and dissipation of heat can be made uniform. As a result, temperatures of the cells become uniform and scattering of cell capacity can be inhibited and the cycle life characteristics can be improved.

As explained above, according to the construction of the present invention, there can be provided a unit battery and a system excellent in the cycle life characteristics in which distortion or expansion of the container does not occur, the heat generated in the cell can be efficiently discharged out of the cell and scattering in the cell capacity can be inhibited.

What is claimed is:

1. A unit battery of sealed alkaline storage battery comprising a plurality of cells each of which comprises a container which contains an alkali electrolyte and an electrode group comprising a plurality of positive plates and a plurality of negative plates with separators provided between the adjacent plates and which is sealed by a cap provided with a safety valve, the adjacent cells being electrically connected, wherein the outermost plates of the electrode group in the plate-stacking direction in each of the cells contacts with the respective container, the adjacent cells contact with each other in the plate-stacking direction at a part of the respective containers at least near the center of the contact surface thereof, and a space through which air can pass in one direction is provided between the adjacent cells, the unit batter being constrained by holders at a part or the whole surface of both ends in the direction of arrangement of the cells.

2. A unit battery according to claim 1 which comprises 5–40 cells connected electrically in series.

3. A unit battery according to claim 1 wherein the container is provided with many dented and projected portions on the outside.

4. A unit battery according to claim 1 wherein the projected portions on the containers of the adjacent cells contact with each other and air passes through the space formed by the dented portions.

5. A unit battery according to claim 1 wherein at least one of the projected portion is fitted in at least one of the dented portion.

6. A unit battery according to claim 3 wherein the dented and projected portions are provided in either vertical or horizontal direction.

7. A unit battery according to claim 1 wherein the surface of the container has black or dark brown color.

8. A unit battery according to claim 1 wherein at least a part of the surface of the container is provided with a metal part which is selected from the group consisting of Al, Cu, Fe and Ni.

9. A unit battery according to claim 1 wherein the cap and/or the container are made of mainly polypropylene.

10. A unit battery according to claim 1 wherein the cap and/or the container are made of a metal.

11. A unit battery according to claim 1 wherein the cap and/or the container are made of mainly polypropylene and have inside a material higher in thermal conductivity than polypropylene.

12. A unit battery according to claim 11 wherein the material higher in thermal conductivity than polypropylene is selected from Cu, Ni, Fe, C, $Al_2O_3$ and MgO.

13. A unit battery according to claim 1 wherein spaces through which air passes in at least one direction are provided between the holder at the both ends in the direction of arrangement of the cells and the cell closest to the holder.

14. A unit battery according to claim 1 wherein air passes through the space at a velocity of 0.1–5 m/s at least at the time of charging.

15. A unit battery according to claim 1 wherein the electrode group is present in the container and the outermost part of the electrode group is a negative plate, a separator, a positive plate, a metal plate or a metal porous body.

16. A unit battery according to claim 1 wherein the holder is made of a metal selected from aluminum, iron and nickel.

17. A unit battery according to claim 1 wherein the thickness of the container through which air passes is 1–5 mm.

18. A unit battery according to claim 1 wherein the width of the space between the cells through which air passes is 1–4 mm.

19. A unit battery according to claim 1 wherein the cell comprises sheets of positive electrodes having a structure of a three-dimensional metallic porous body in which powders of a metal oxide are held or a plate-like metal on both sides of which powders of a metal oxide are held, sheets of negative electrodes having a structure of a three-dimensional metallic porous body in which powders of a hydrogen-storing alloy capable of electrochemically occluding or releasing hydrogen are held or a planar plate-like metal on both sides of which powders of said alloy are held by sintering or coating with a binder, polyolefinic separators and an electrolyte comprising an aqueous alkali solution in an amount of 1.3–2.8 $cm^3$ per 1 Ah of theoretical capacity of the positive electrode.

20. A unit battery according to claim 1 wherein the safety valve provided at the cap of the cell can return to the original state and works at a difference of pressure of 1–5 $kg/cm^2$.

21. A unit battery of sealed alkaline storage battery comprising a plurality of cells each of which comprises a container which contains an alkali electrolyte and an electrode group comprising as plurality of positive plates and a plurality of negative plates with separators provided between the adjacent plates and which is sealed by a cap provided with a safety valve, the adjacent cells being electrically connected, wherein the outermost plates of the electrode group in the plate-stacking direction in each of the cells contacts with the respective container, an interval between the adjacent cells in the plate-stacking direction is fixed by a spacer at least near the center of the contact surface thereof, and a space through which air can pass in at least one direction is provided between the spacer and the adjacent cell, the unit battery being constrained by holders at a part or the whole surface of both ends in the direction of arrangement of the cells.

22. A unit battery according to claim 21 which comprises 5–40 cells connected electrically in series.

23. A unit battery according to claim 21 wherein the spacer is provided with many dented and projected portions.

24. A unit battery according to claim 21 wherein the projected portion provided on the spacer contacts with the container and air passes through the space formed by the dented portion of the spacer and the container.

25. A unit battery according to claim 21 wherein the dented and projected portions are provided in either vertical or horizontal direction.

26. A unit battery according to claim 21 wherein the spacer has a flat outside and spaces through which air can pass vertically or horizontally are provided inside the spacer.

27. A unit battery according to claim 21 wherein the spacer is made of a metal.

28. A unit battery according to claim 21 wherein the surface of the spacer has black or dark brown color.

29. A unit battery according to claim 21 wherein the surface of the container has black or dark brown color.

30. A unit battery according to claim 21 wherein at least a part of the surface of the container is provided with a metal part which is selected from the group consisting of Al, Cu, Fe and Ni.

31. A unit battery according to claim 21 wherein the cap and/or the container are made of polypropylene.

32. A unit battery according to claim 21 wherein the cap and/or the container are made of a metal.

33. A unit battery according to claim 21 wherein the cap and/or the container are made of a resin mainly composed if polypropylene and have inside a material higher in thermal conductivity than polypropylene.

34. A unit battery according to claim 21 wherein the material higher in thermal conductivity than polypropylene is selected from Cu, Ni, Fe, C, $Al_2O_3$ and MgO.

35. A unit battery according to claim 21 wherein spaces through which air passes in at least one direction are provided between the holder at the both ends in the direction of arrangement of the cells and the cell closest to the holder.

36. A unit battery according to claim 21 wherein air passes through the space at a velocity of 0.1–5 m/s at least at the time of charging.

37. A unit battery according to claim 21 wherein the elect code group is present in the container and the outermost part of the electrode group is a negative plate, a separator, a positive plate, a metal plate or a metal porous body.

38. A unit battery according to claim 21 wherein the holder is made of a metal selected from aluminum, iron and nickel.

39. A unit battery according to claim 21 wherein the thickness of the container along which the air passes is 1–5 mm and the thickness of the spacer is 1–5 mm.

40. A unit battery according to claim 21 wherein the cell comprises sheets of positive electrodes having a structure of a three-dimensional metallic porous body in which powders of a metal oxide are held or a plate-like metal on both sides of which powders of a metal oxide are held, sheets of negative electrode having a structure of a three-dimensional metallic porous body in which powders of a hydrogen-storing alloy capable of electrochemically occluding or releasing hydrogen are held or a planar plate-like metal on both sides of which powders of said alloy are held by sintering or coating with a binder, polyolefinic separators and an electrolyte comprising an aqueous alkali solution in an amount of 1.3–2.8 cm$^3$ per 1 Ah of theoretical capacity of the positive electrode.

41. A unit battery according to claim 21 wherein the safety valve provided at the cap of the cell can return to the original state and works at a difference of pressure of 1–5 kg/cm$^2$.

42. A sealed alkaline storage battery system of an assembled battery comprising a combination of a plurality of unit batteries each of which comprises a plurality of cells comprising a container which contains an alkali electrolyte and an electrode group comprising a plurality of positive plates and a plurality of negative plates with separators provided between the adjacent plates and which is sealed by a cap provided with a safety valve, the adjacent cells and the adjacent unit batteries being electrically connected, wherein the outermost plates of the electrode group in the plate stacking direction in each of the cells contacts with the respective container; a space through which air can pass in at least one direction is provided between the adjacent cells; the unit battery is constrained by holders at a part or the whole surface of both ends in the direction of arrangement of the cells; said assembled battery is fixed at a carrier; and air is forcedly passed between the cells by means of suction or exhaustion or both the suction and the exhaustion using a fan or a blower.

43. A sealed alkaline storage battery system according to claim 42 wherein the air passes from the bottom to the top of the battery.

44. A sealed alkaline storage battery system according to claim 42 which has the structure that the bottom of the carrier contacts with air and this air passes through at least a hole provided at the carrier and through the spaces provided between the cells or the unit batteries.

45. A sealed alkaline storage battery system according to claim 42 which has an exhaust vent which discharges the air out of the battery system.

46. A sealed alkaline storage battery system according to claim 42 wherein a space through which air can pass is provided above the assembled battery.

47. A sealed alkaline storage battery system according to claim 42 wherein the air is passed during the charging.

48. A sealed alkaline storage battery system according to claim 42 wherein the air is passed at a velocity of 0.1–5 m/s.

49. A sealed alkaline storage battery system according to claim 42 wherein the interval between the adjacent unit batteries is kept by the holder which applies a pressure to a part or the whole surface of both ends of the unit battery.

50. A sealed alkaline storage battery system according to claim 42 wherein the assembled battery comprises two or more unit batteries connected electrically in series or parallel or in both series and parallel.

51. A sealed alkaline storage battery system according to claim 42 wherein the unit batteries and/or the assembled battery are prevented from movement backward and forward and left and right by a projection provided at the carrier.

52. A sealed alkaline storage battery system according to claim 42 wherein the assembled battery is pressed by a fabric belt or a metallic rod from the above to be prevented from movement in the upward and downward directions in respect to the carrier.

53. A sealed alkaline storage battery system according to claim 42 wherein the cells and the unit batteries are electrically connected by a flexible conductor.

54. A sealed alkaline storage battery system according to claim 42 wherein the cell comprises sheets of positive electrodes having a structure of a three-dimensional metallic porous body in which powders of a metal oxide are held or a plate-like metal on both sides of which powders of a metal oxide are held, sheet of negative electrodes having a structure of a three-dimensional metallic porous body in which powders of a hydrogen-storing alloy capable of electrochemically occluding or releasing hydrogen are held or a planar plate-like metal on both sides of which powders of said alloy are held by sintering or coating with a binder, polyolefinic separators and an electrolyte comprising an aqueous alkali solution in an amount of 1.3–2.8 cm$^3$ per 1 Ah of theoretical capacity of the positive electrode.

55. A sealed alkaline storage battery system according to claim 42 wherein a vibration absorber is provided between the carrier and the battery.

56. A sealed alkaline storage battery system according to claim 55 wherein the vibration absorber is a spring or a rubber.

57. A sealed alkaline storage battery system according to claim 42 wherein the carrier is fixed at an apparatus in which the assembled battery is mounted.

58. A sealed alkaline storage battery system according to claim 42 wherein the unit battery comprises cells in which at least a part of the outermost portion of the electrode group in the cell contacts with the container the interval between the adjacent cells is fixed by the spacer and a space through which air can pass in at least one direction is provided between the spacer and the adjacent cell.

59. A sealed alkaline storage battery system according to claim 42 wherein the air passing through the space has a temperature of −20°–50° C.

60. A unit battery according to claim 13 wherein air passes through the space at a velocity of 0.1–5 m/s at least at the time of charging.

61. A unit battery according to claim 35 wherein air passes through the space at a velocity of 0.1–5 m/s at least at the time of charging.

* * * * *